US012285381B1

(12) United States Patent
Rubio et al.

(10) Patent No.: US 12,285,381 B1
(45) Date of Patent: Apr. 29, 2025

(54) DETACHABLE WALKER BASKET AND RELATED SYSTEM

(71) Applicant: Boondocks West LLC, Temecula, CA (US)

(72) Inventors: Luz Jovita Rubio, Temecula, CA (US); George Vega, Temecula, CA (US)

(73) Assignee: Boondocks West LLC, Temecula, CA (US)

( * ) Notice: Subject to any disclaimer, the term of this patent is extended or adjusted under 35 U.S.C. 154(b) by 0 days.

(21) Appl. No.: 18/978,759

(22) Filed: Dec. 12, 2024

Related U.S. Application Data

(60) Provisional application No. 63/609,165, filed on Dec. 12, 2023.

(51) Int. Cl.
*A61H 3/04* (2006.01)
*A61H 3/00* (2006.01)

(52) U.S. Cl.
CPC ......... *A61H 3/04* (2013.01); *A61H 2003/002* (2013.01)

(58) Field of Classification Search
CPC ........................................................ A61H 3/04
See application file for complete search history.

(56) References Cited

U.S. PATENT DOCUMENTS 2,761,481 A * 9/1956 Boatwright .......... A61G 7/0503 383/22
3,957,071 A * 5/1976 Kenner .................... A61H 3/00 108/115
4,184,618 A * 1/1980 Jones ...................... A47F 10/00 D3/319
4,403,786 A * 9/1983 Ulics .................... A61G 5/1094 297/188.2
4,449,750 A * 5/1984 Pultman ................... A61G 5/10 224/558
4,491,257 A * 1/1985 Ingles ...................... A61H 3/00 297/188.2
4,676,416 A * 6/1987 Harmon ................... A61H 3/00 224/407
4,800,911 A * 1/1989 Endres ..................... A61H 3/00 D12/130
4,848,627 A * 7/1989 Maeda .................... E05B 83/32 248/311.2
4,946,058 A * 8/1990 Stamm ..................... A61H 3/00 224/558
5,170,810 A 12/1992 Chapin
5,273,063 A 12/1993 Farr
(Continued)

*Primary Examiner* — Brian D Nash
(74) *Attorney, Agent, or Firm* — CP LAW GROUP PC; Cy Bates

(57) ABSTRACT

A detachable walker basket and system is disclosed, designed to enhance mobility and accessibility for users of walking aid devices. The basket includes a front basket with a storage compartment, a rear tray with deployable and retractable states, and a front lip for securing items. The design incorporates structural inserts for stability, folding side supports for compact storage, and multiple fasteners for detachable attachment to various walking aids. The rear tray and front lip allow for convenient access and secure storage, while the fasteners enable compatibility with walkers, rollators, and similar devices. The system is lightweight, user-friendly, and improves independence for individuals by providing a versatile and portable storage solution.

20 Claims, 14 Drawing Sheets

(56) References Cited

U.S. PATENT DOCUMENTS

| | | | | | |
|---|---|---|---|---|---|
| 5,294,027 | A * | 3/1994 | Plastina | A61G 5/10 | 224/558 |
| 5,392,802 | A * | 2/1995 | Farr | A61H 3/00 | D6/406.1 |
| 5,480,079 | A * | 1/1996 | Douglass | A61G 5/10 | 224/558 |
| 5,605,345 | A * | 2/1997 | Erfurth | A61G 5/08 | 280/47.39 |
| 5,647,602 | A * | 7/1997 | Nevin | A61H 3/04 | 482/68 |
| 5,813,582 | A * | 9/1998 | Wright | A61G 5/10 | 297/188.2 |
| 5,882,067 | A * | 3/1999 | Carbajal | A61H 3/00 | 135/74 |
| 6,296,263 | B1 | 10/2001 | Schultz | | |
| 6,340,168 | B1 * | 1/2002 | Woleen | A61G 5/0833 | 280/33.996 |
| 6,651,683 | B1 | 11/2003 | Hooks | | |
| 8,915,517 | B1 * | 12/2014 | Jacobs | B62J 9/20 | 280/727 |
| 9,271,891 | B2 * | 3/2016 | Andersen | A61H 3/00 | |
| 9,510,983 | B2 * | 12/2016 | Smith | A61G 5/10 | |
| 11,583,466 | B1 * | 2/2023 | McGee | F21S 9/02 | |
| 11,930,898 | B1 * | 3/2024 | Carstens | A45B 3/00 | |
| 11,951,353 | B2 * | 4/2024 | Briscoe | A63B 21/068 | |
| 2002/0179131 | A1 | 12/2002 | Johnson | | |
| 2007/0278271 | A1 | 12/2007 | Koren | | |
| 2014/0125037 | A1 * | 5/2014 | Andersen | A61H 3/04 | 280/47.38 |
| 2014/0232078 | A1 * | 8/2014 | Kirby | A61H 3/04 | 280/47.35 |
| 2015/0250674 | A1 | 9/2015 | Moore | | |
| 2017/0239128 | A1 | 8/2017 | Flora | | |
| 2018/0369059 | A1 | 12/2018 | Shirley | | |
| 2021/0154083 | A1 | 5/2021 | Downes | | |
| 2024/0299232 | A1 | 9/2024 | Knopow | | |

* cited by examiner

DETACHABLE WALKER BASKET AND RELATED SYSTEM

CROSS-REFERENCE TO RELATED APPLICATIONS

This application claims benefit of priority with U.S. Provisional Application Ser. No. 63/609,165, filed Dec. 12, 2023; the entire contents of which are hereby incorporated by reference.

BACKGROUND

Field of the Invention

This invention relates to detachable walker baskets; more particularly, detachable walker baskets with rear trays hingedly coupled therewith.

Description of the Related Art

A walker basket attachment is a practical accessory designed to enhance the utility of a walker for individuals with mobility challenges. This attachment typically comprises a basket, pouch, or other type of main compartment that securely attaches to the frame of the walker or rollator. Its primary purpose is to provide a convenient storage solution, allowing users to carry personal belongings like water bottles, reading materials, medications, or small groceries while using the walker. The attachment is easily installed with adjustable straps or hooks, ensuring accessibility to essential items. A walker basket attachment caters to different preferences, whether users prefer an open wire basket or a closed pouch-like structure. Despite adding minimal weight, the attachment significantly contributes to users' ability to maneuver their walkers without undue effort. Many attachments are easily detachable, allowing users to remove the basket as needed for tasks such as folding the walker for storage or transportation. By offering a means for users to carry their personal items, a walker basket attachment promotes independence and self-sufficiency for individuals facing mobility limitations.

Users of walker baskets often have various-sized and differently shaped items requiring varying levels of accessibility. There is a need for a detachable walker basket with improved accessibility of items contained therein.

SUMMARY

This invention discloses a detachable walker basket system designed to enhance the utility and accessibility of walking aids for individuals with mobility challenges. The system includes a front basket with a compartment formed by multiple sides and a bottom section, a rear tray hingedly coupled to the basket for both retracted and deployed states, and a front lip that ensures secure item placement. The invention incorporates monolithic inserts for structural stability, first and second side supports with folding mechanisms for compact storage, and a plurality of external fasteners enabling detachable coupling to walking aids like walkers or rollators. Additional features include customizable accessory straps and optional storage dividers. The system is configured to be lightweight, easy to install, and capable of improving the user's independence by allowing secure transport of personal items while using a walking aid.

BRIEF DESCRIPTION OF THE DRAWINGS

Other features, combinations, and embodiments will be appreciated by one having the ordinary level of skill in the art upon a thorough review of the following details and descriptions, particularly when reviewed in conjunction with the drawings, wherein.

DETAILED DESCRIPTION

Figure 1:
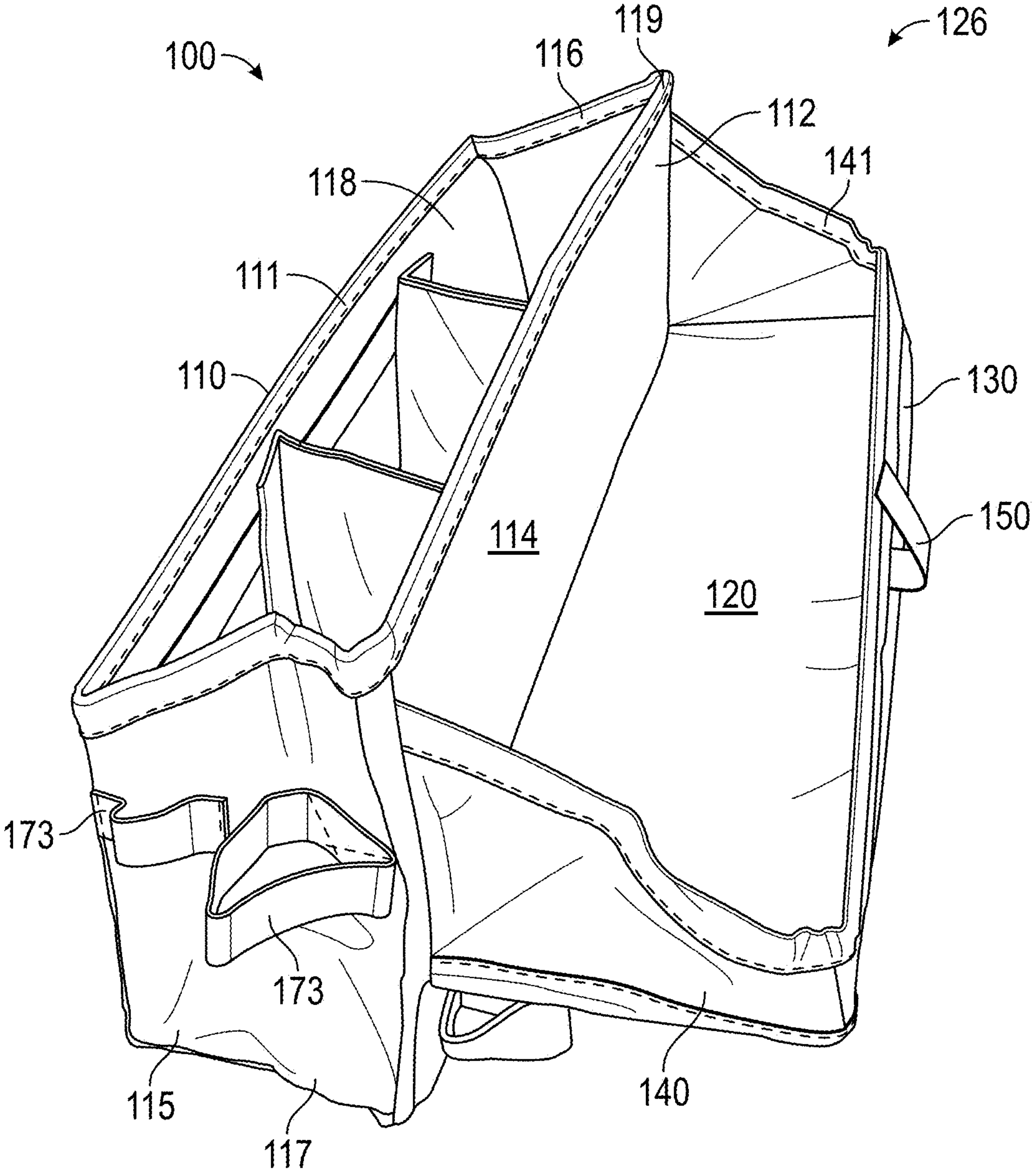
FIG. 1 shows a rear perspective view of a detachable walker basket in accordance with a first illustrated embodiment.
Figure 2:
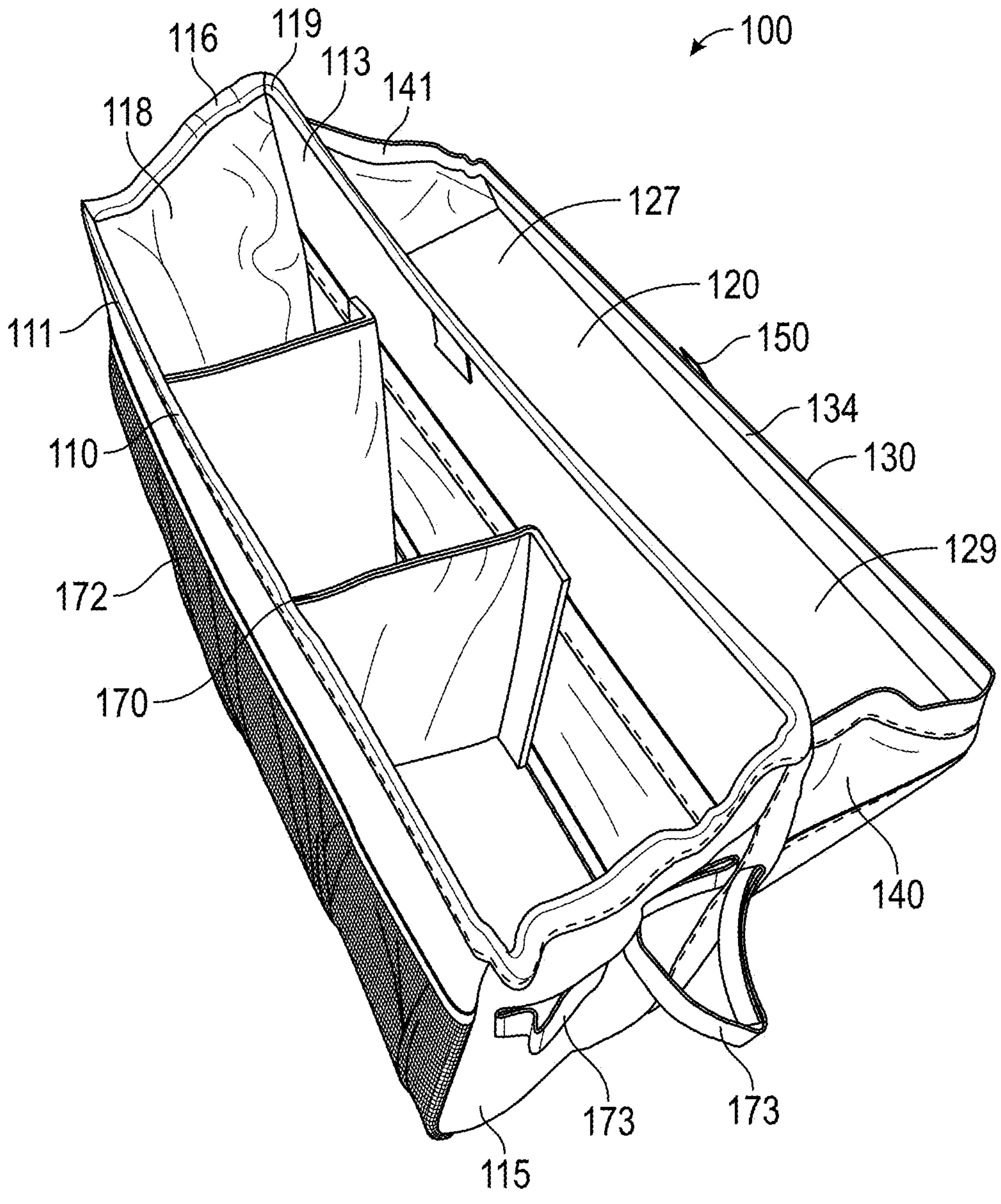
FIG. 2 shows a front perspective view of the detachable walker basket according to the first illustrated embodiment.
Figure 3:
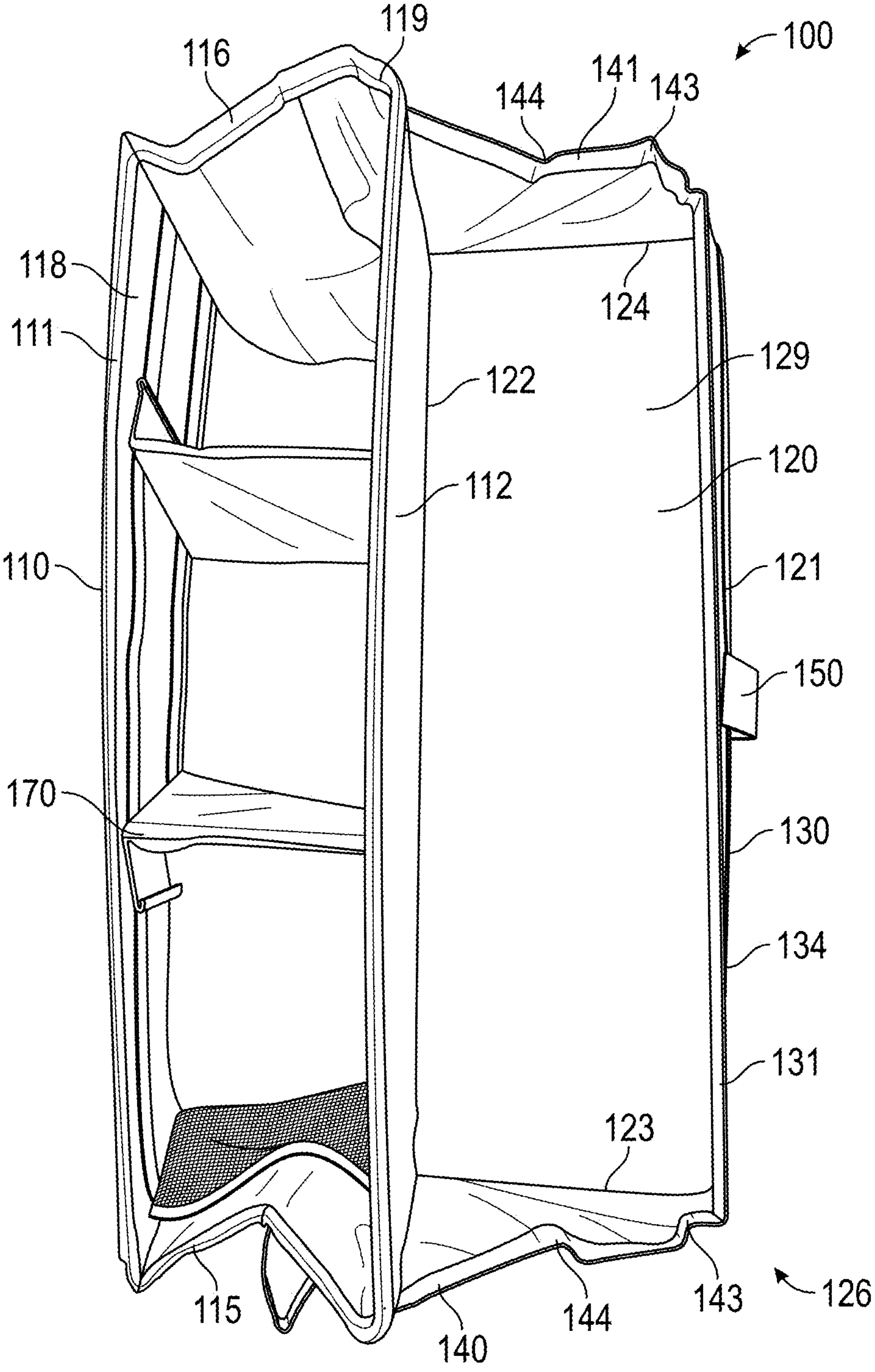
FIG. 3 shows a top view of the detachable walker basket according to the first illustrated embodiment.
Figure 4:
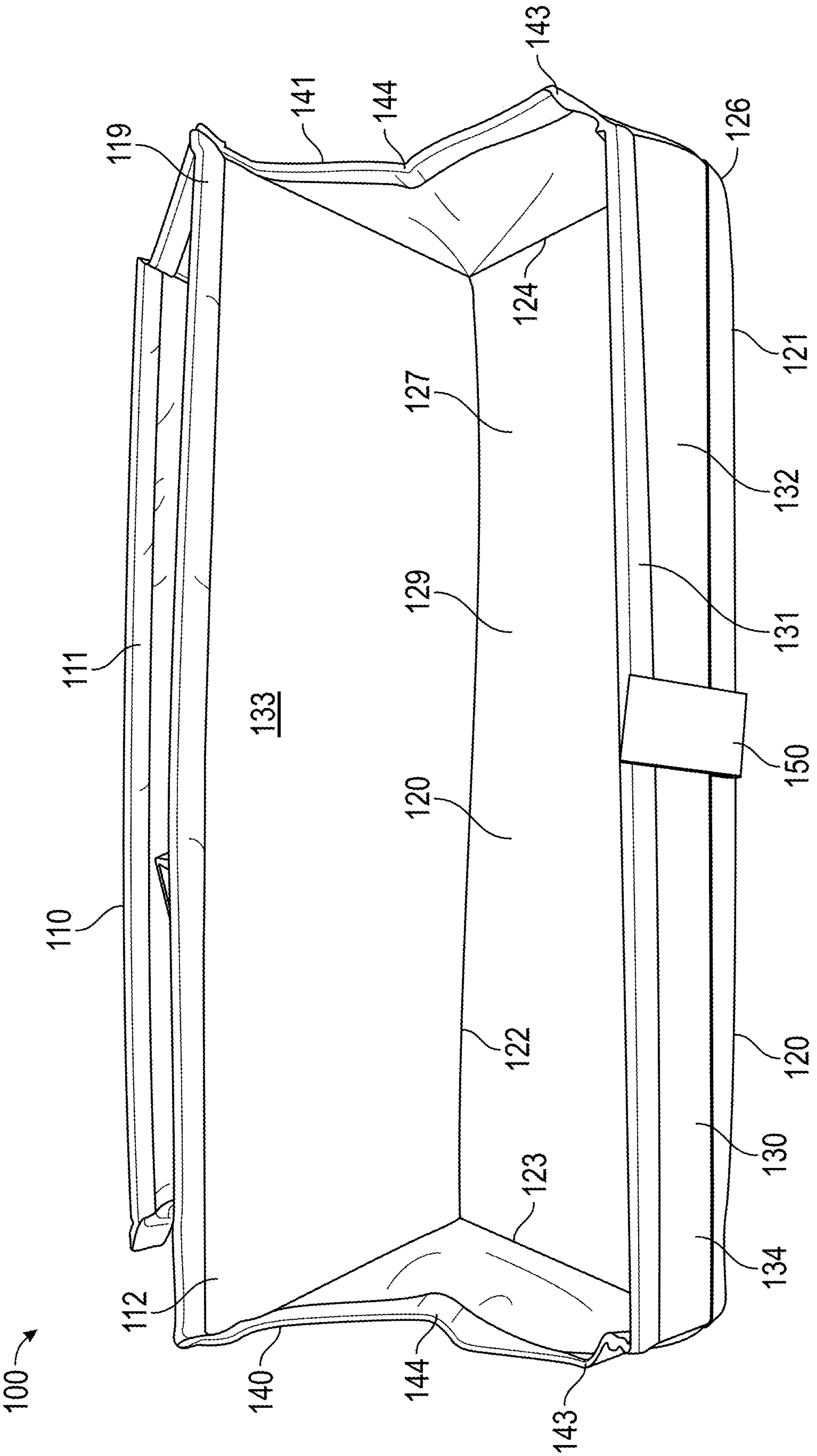
FIG. 4 shows an upper rear view of the detachable walker basket according to the first illustrated embodiment.
Figure 5:
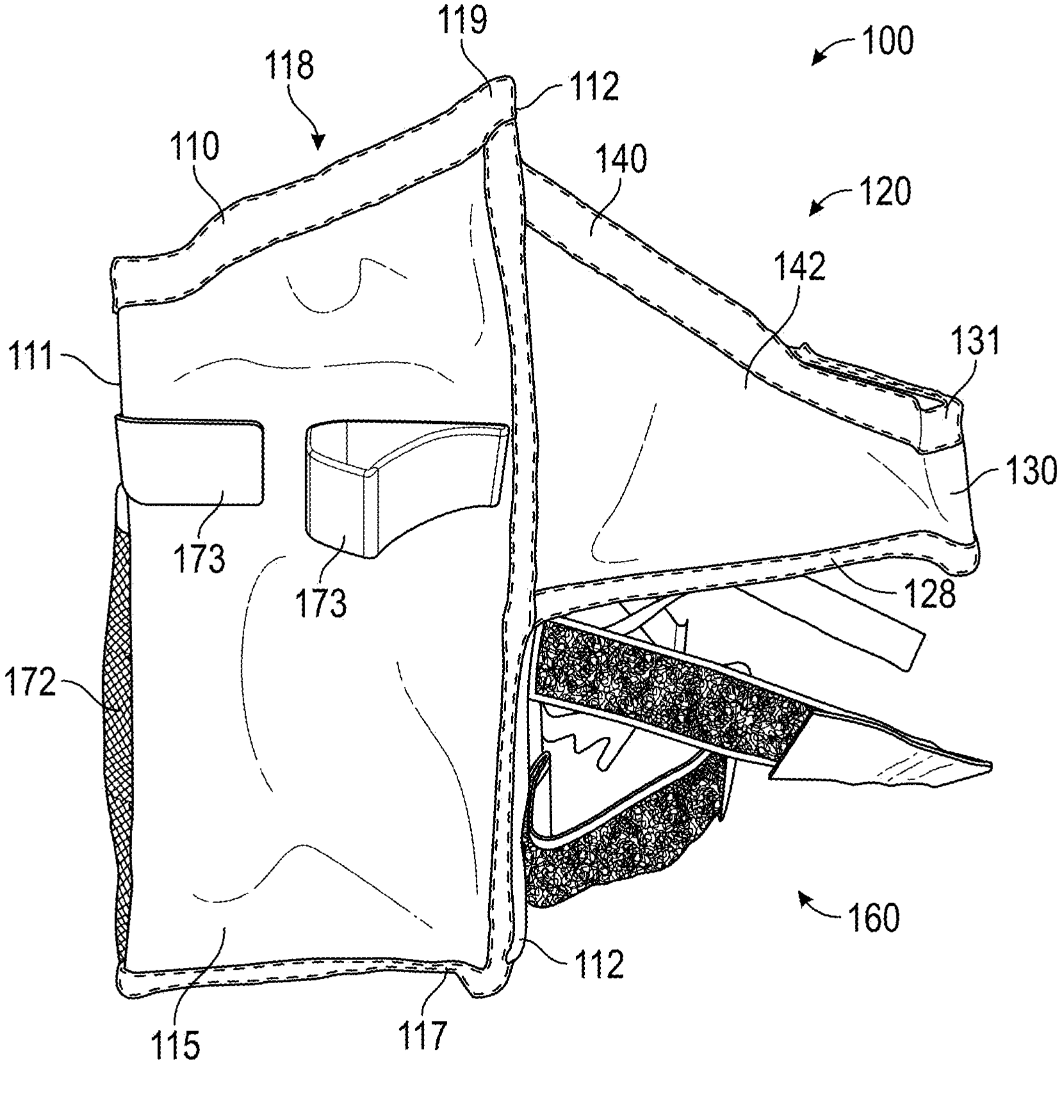
FIG. 5 shows a side view of the detachable walker basket according to the first illustrated embodiment.
Figure 6:
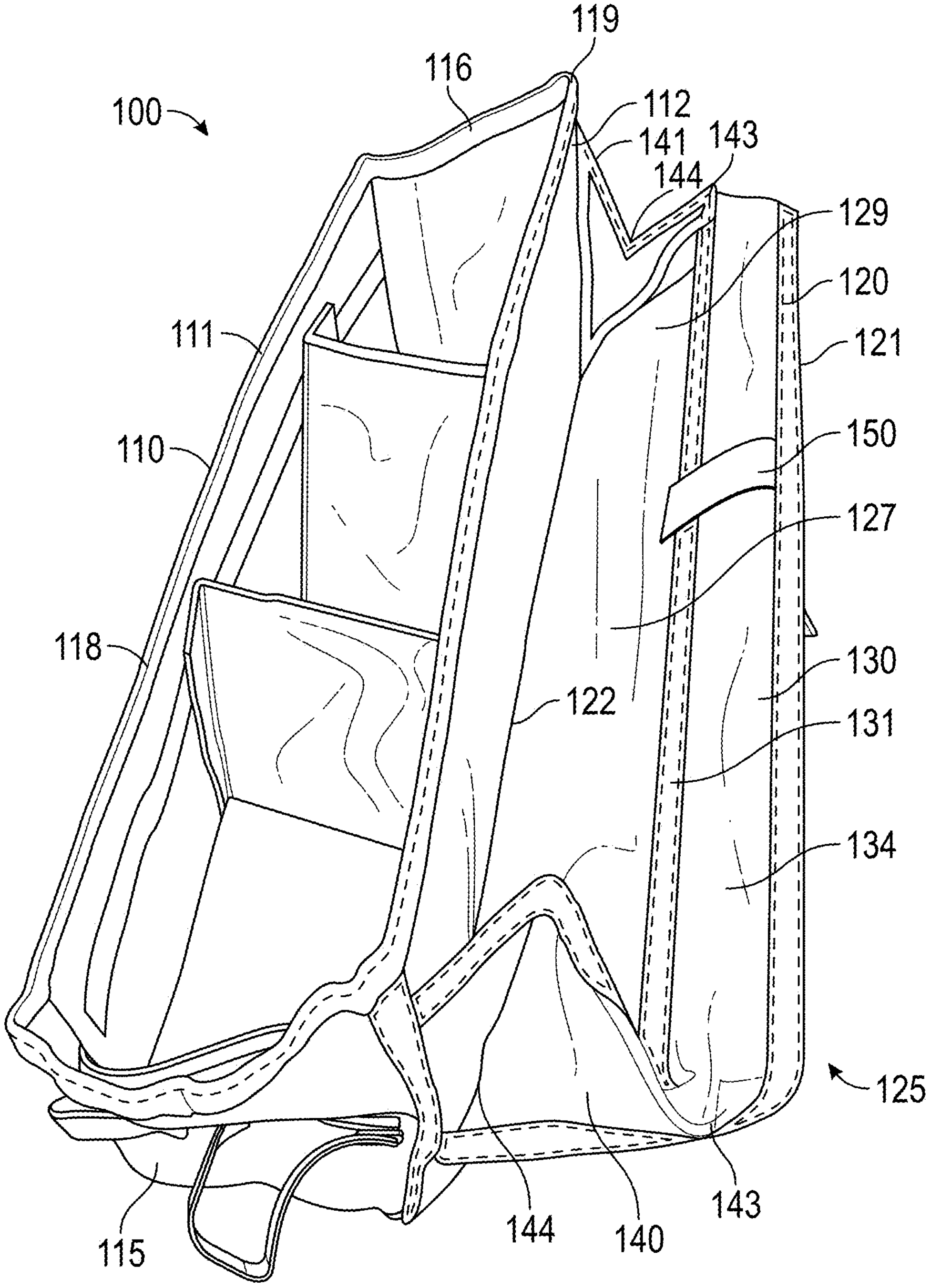
FIG. 6 shows a perspective view of a rear tray of the detachable walker basket entering a retracted state according to the first illustrated embodiment.
Figure 7:
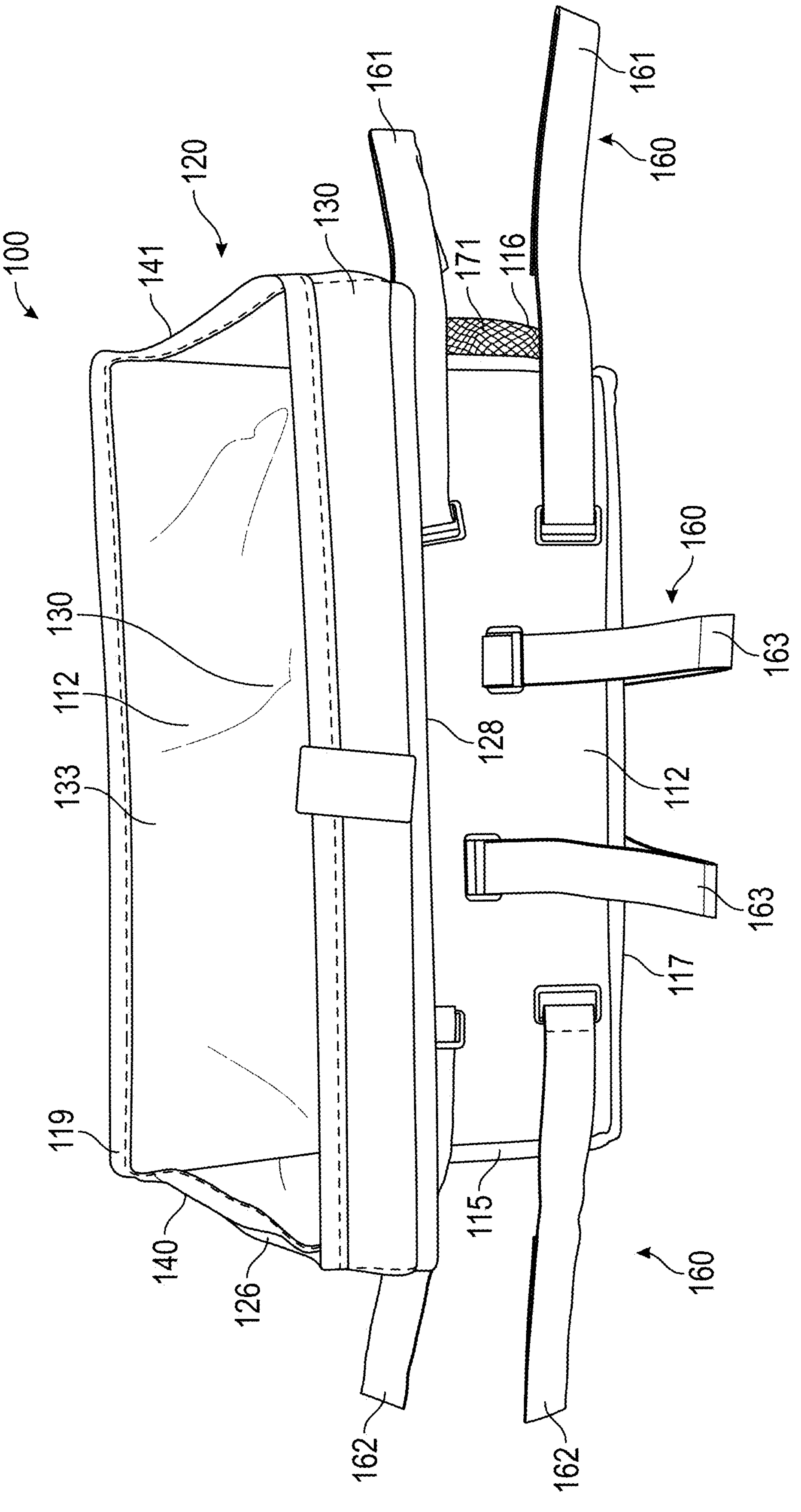
FIG. 7 shows a rear view of the detachable walker basket in a deployed state according to the first illustrated embodiment.
Figure 8:
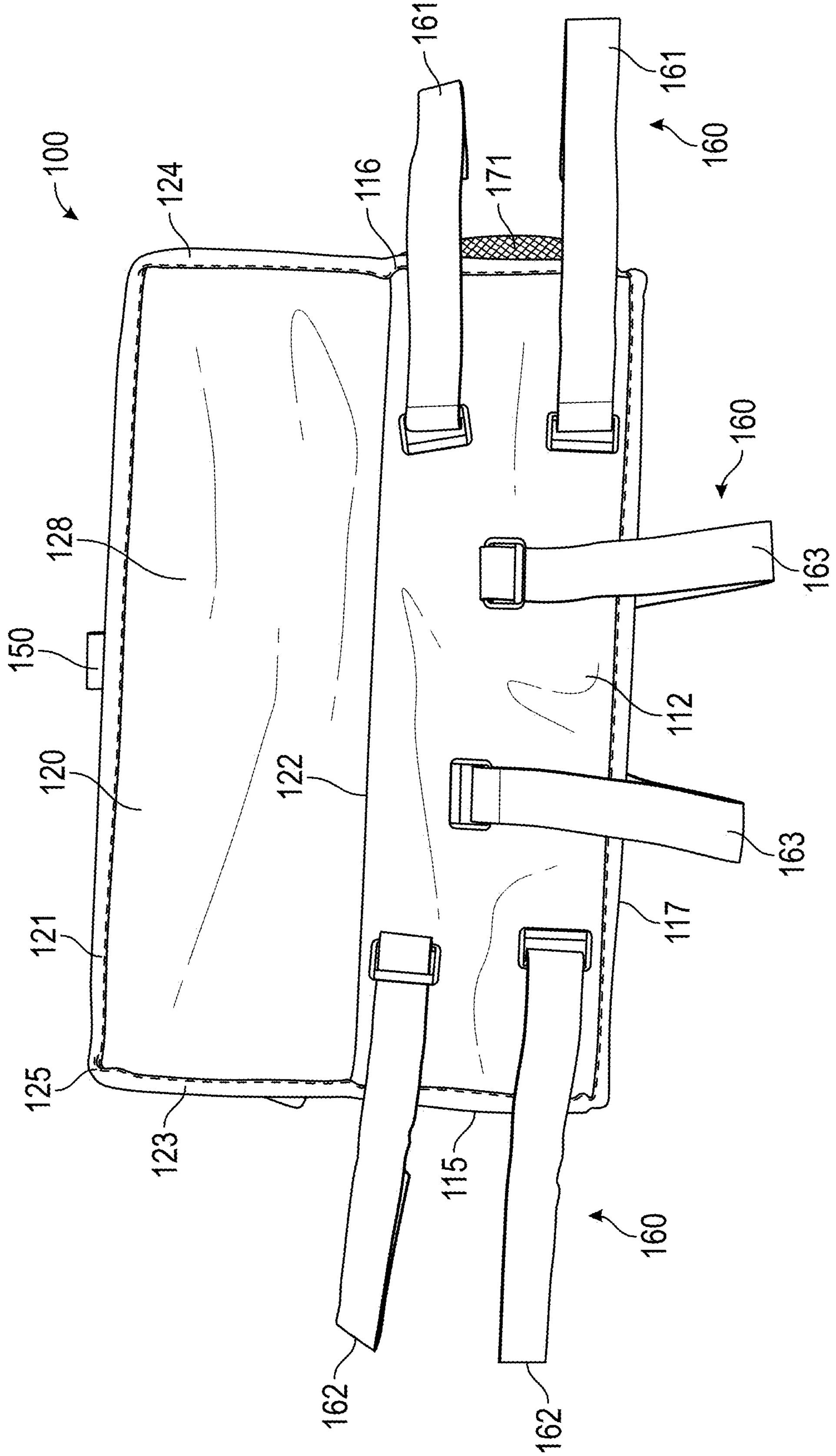
FIG. 8 shows a rear view of the detachable walker basket in the retracted state according to the first illustrated embodiment.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

For purposes herein, the term "tray backside" means the portion of the rear side extending from the rear edge of the rear tray up to the upper basket edge.

The term "mutually perpendicular" means that each pair of elements in a group of elements is at a 90-degree angle with one another.

The term "walking aid device" refers to walkers, rollators, and similar mobility devices designed to assist individuals in walking.

Unless explicitly defined herein, terms are to be construed in accordance with the plain and ordinary meaning as would be appreciated by one having skill in the art.

GENERAL DESCRIPTION OF EMBODIMENTS

In one general embodiment, a detachable walker basket is disclosed. The walker basket includes a front basket comprising a basket compartment formed by a front side, a rear side opposite the front side, a first lateral side, a second lateral side opposite the first lateral side, and a bottom section. The rear side further comprises an outer surface and an inner surface opposite the outer surface, wherein the inner surface forms a portion of the basket compartment. The detachable walker basket further comprises a rear tray having an upper surface and a lower surface opposite the upper surface, a front edge, a rear edge opposite the front edge, a first side edge, and a second side edge opposite the first side edge. The rear edge is hingedly coupled to the rear side at the outer surface. The rear tray is configurable in a retracted state and a deployed state. In the deployed state, the rear tray forms a perpendicular relationship with the rear side, while in the retracted state, the upper surface of the rear tray contacts the rear side. The rear tray further comprises a first monolithic insert integrated within its structure. The detachable walker basket further comprises a front lip rotatably coupled to the rear tray at the front edge, forming an orthogonal relationship with the rear tray in the deployed state. While in the retracted state, the front lip contacts the upper surface of the rear tray, forming a parallel relationship with it. The front lip further comprises a second monolithic insert, which is separate and distinct from the first monolithic insert. The detachable walker basket further comprises a first side support and a second side support, each coupled to the rear tray and the front lip. The first side support is coupled at the first side edge and the second side support is coupled at the second side edge. The first side support and second side support form a parallel relationship while in the deployed state and are both mutually perpendicular to the front lip and the rear tray. When entering the retracted state, the first side support and the second side support each further comprise a first fold and a second fold, wherein the first fold is configured to rotate the front lip to contact the upper surface of the rear tray, and the second fold is configured to rotate the rear tray towards the rear side such that the upper surface of the rear tray and the front lip both contact the outer surface of the rear side. The detachable walker basket further comprises a fastener element, which is coupled to at least one of the rear tray or the front lip. The fastener element is configured to engage with the front basket to maintain the rear tray in the retracted state. The detachable walker basket further comprises a plurality of external fasteners coupled to the rear side below the rear tray. These external fasteners are configured to detachably couple to a walking aid device. The plurality of external fasteners further comprises a right horizontal fastener, a left horizontal fastener, and a center vertical fastener. The right horizontal fastener extends past the second lateral side of the front basket, the left horizontal fastener extends past the first lateral side of the front basket, and the center vertical fastener extends past the bottom section of the front basket.

In some embodiments, the rear tray may be configured to be disposed between the front basket and a user of the walking aid device when the detachable walker basket is installed.

In some embodiments, the detachable walker basket may further comprise a tray backside, wherein the tray backside further includes a portion of the rear side that extends from a hinged coupling of the rear tray to an upper basket edge of the rear side to form a tray backside height. Additionally, the detachable walker basket may further comprise the front lip comprising a lip height extending from the rear tray to a lip upper edge, wherein the lip height is less than the tray backside height.

In some embodiments, the front lip may contact the outer surface of the rear side when in the retracted state.

In some embodiments, the first side support and the second side support may each further comprise a trapezoidal shape.

In some embodiments, the detachable walker basket may further comprise one or more accessory straps coupled to at least one of the first lateral side or the second lateral side, each of the one or more accessory straps configured to receive a cylindrical object.

In some embodiments, the rear tray is fixedly coupled to the front basket. In other embodiments, the rear tray is detachably coupled to the front basket.

In another general embodiment, a detachable walker basket may include a front basket comprising a basket compartment. The basket compartment is formed by a front side, a rear side opposite the front side, a first lateral side, a second lateral side opposite the first lateral side, and a bottom section. The detachable walker basket may further include a rear tray hingedly coupled to the rear side of the front basket. The rear tray comprises an upper surface and a lower surface opposite the upper surface, and it is configurable in both a retracted state and a deployed state. In the deployed state, the rear tray forms a perpendicular relationship with the rear side of the front basket, while in the retracted state, the upper surface of the rear tray contacts the rear side. Additionally, a plurality of external fasteners may be coupled to the rear side of the front basket, with the plurality of fasteners configured to detachably couple the detachable walker basket to a walking aid device.

In some embodiments, the rear tray may be configured to be disposed between the front basket and the user of the walking aid device when the detachable walker basket is installed.

In some embodiments, the rear side may further comprise an outer surface and an inner surface opposite the outer surface, wherein the inner surface forms a portion of the basket compartment, wherein the rear tray is coupled to the rear side at the outer surface.

In some embodiments, each of the plurality of external fasteners may be disposed below the rear tray.

In some embodiments, the rear tray may further comprise a first monolithic insert.

In some embodiments, the detachable walker basket may further comprise a front lip rotatably coupled to the rear tray.

In some embodiments, the front lip may further comprise a second monolithic insert.

In some embodiments, the detachable walker basket may further comprise a tray backside, wherein the tray backside further includes a portion of the rear side that extends from a hinged coupling of the rear tray to an upper basket edge of the rear side to form a tray backside height. Additionally, the detachable walker basket may further comprise the front lip comprising a lip height extending from the rear tray to a lip upper edge, wherein the lip height is less than the tray backside height.

In some embodiments, the front lip may comprise an orthogonal relationship with the rear tray when in the deployed state.

In some embodiments, the front lip may contact the upper surface of the rear tray to form a parallel relationship therewith when in the retracted state.

In some embodiments, the front lip may contact the outer surface of the rear side when in the retracted state.

In some embodiments, the detachable walker basket may further comprise a first side support and a second side support. The first and second side supports may be coupled to the rear tray at opposite sides and form a parallel relationship while in the deployed state, with both the first side support and the second side support further coupled to the front lip.

In some embodiments, the first side support and the second side support may each further comprise a trapezoidal shape.

In some embodiments, the first side support and the second side support may each further comprise a first fold and a second fold while entering the retracted state, wherein the first fold is configured to rotate the front lip to contact the upper surface of the rear tray, and the second fold is configured to rotate the rear tray towards the rear side such that the upper surface of the rear tray and the front lip both contact the outer surface of the rear side.

In some embodiments, the first side support and the second side support may be mutually perpendicular with the front lip and the rear tray while in the deployed state.

In some embodiments, the detachable walker basket may further comprise a fastener element coupled to at least one of the rear tray or the front lip, wherein the fastener element is configured to engage with the front basket to maintain the rear tray in the retracted state.

In some embodiments, the plurality of external fasteners may further comprise a right horizontal fastener, a left horizontal fastener, and a center vertical fastener.

In some embodiments, the right horizontal fastener may extend past the second lateral side of the front basket, the left horizontal fastener may extend past the first lateral side of the front basket, and the center vertical fastener may extend past the bottom section of the front basket.

In some embodiments, the detachable walker basket may further comprise one or more accessory straps coupled to at least one of the first lateral side or the second lateral side, each of the one or more accessory straps configured to receive a cylindrical object.

In some embodiments, the rear tray is fixedly coupled to the front basket. In other embodiments, the rear tray is detachably coupled to the front basket.

In another general embodiment, a walking aid system is disclosed, comprising a detachable walker basket and a walking aid device. The detachable walker basket includes a front basket comprising a basket compartment formed by a front side, a rear side opposite the front side, a first lateral side, a second lateral side opposite the first lateral side, and a bottom section. A rear tray is hingedly coupled to the rear side of the front basket. The rear tray comprises an upper surface and a lower surface opposite the upper surface, and is configurable in both a retracted state and a deployed state. In the deployed state, the rear tray forms a perpendicular relationship with the rear side, while in the retracted state, the upper surface of the rear tray contacts the rear side. The detachable walker basket also comprises a plurality of external fasteners coupled to the rear side, configured to detachably couple to a walking aid device. The walking aid device comprises a horizontal crossbar, a first side frame and a second side frame, wherein each side frame is coupled to opposite ends of the horizontal crossbar. Each of the first and second side frames comprises a handrail and a plurality of vertically extending legs. The plurality of external fasteners is coupled to the horizontal crossbar, as well as to one of the plurality of vertically extending legs of the first side frame and one of the plurality of vertically extending legs of the second side frame.

In some embodiments, the rear tray may be configured to be disposed between the front basket and the user of the walking aid device when the detachable walker basket is installed.

In some embodiments, the rear side may further comprise an outer surface and an inner surface opposite the outer surface, wherein the inner surface forms a portion of the basket compartment, wherein the rear tray is coupled to the rear side at the outer surface.

In some embodiments, each of the plurality of external fasteners may be disposed below the rear tray.

In some embodiments, the rear tray may further comprise a first monolithic insert.

In some embodiments, the detachable walker basket may further comprise a front lip rotatably coupled to the rear tray.

In some embodiments, the front lip may further comprise a second monolithic insert.

In some embodiments, the detachable walker basket may further comprise a tray backside, wherein the tray backside further includes a portion of the rear side that extends from a hinged coupling of the rear tray to an upper basket edge of the rear side to form a tray backside height. Additionally, the detachable walker basket may further comprise the front lip comprising a lip height extending from the rear tray to a lip upper edge, wherein the lip height is less than the tray backside height.

In some embodiments, the front lip may comprise an orthogonal relationship with the rear tray when in the deployed state.

In some embodiments, the front lip may contact the upper surface of the rear tray to form a parallel relationship therewith when in the retracted state.

In some embodiments, the front lip may contact the outer surface of the rear side when in the retracted state.

In some embodiments, the detachable walker basket may further comprise a first side support and a second side support. The first and second side supports may be coupled to the rear tray at opposite sides and form a parallel relationship while in the deployed state, with both the first side support and the second side support further coupled to the front lip.

In some embodiments, the first side support and the second side support may each further comprise a trapezoidal shape.

In some embodiments, the first side support and the second side support may each further comprise a first fold and a second fold while entering the retracted state, wherein the first fold is configured to rotate the front lip to contact the upper surface of the rear tray, and the second fold is configured to rotate the rear tray towards the rear side such that the upper surface of the rear tray and the front lip both contact the outer surface of the rear side.

In some embodiments, the first side support and the second side support may be mutually perpendicular with the front lip and the rear tray while in the deployed state.

In some embodiments, the detachable walker basket may further comprise a fastener element coupled to at least one of the rear tray or the front lip, wherein the fastener element is configured to engage with the front basket to maintain the rear tray in the retracted state.

In some embodiments, the plurality of external fasteners may further comprise a right horizontal fastener, a left horizontal fastener, and a center vertical fastener.

In some embodiments, the right horizontal fastener may extend past the second lateral side of the front basket, the left horizontal fastener may extend past the first lateral side of the front basket, and the center vertical fastener may extend past the bottom section of the front basket.

In some embodiments, the rear tray is fixedly coupled to the front basket. In other embodiments, the rear tray is detachably coupled to the front basket.

In another generally embodiment, a rear tray configured to couple to a front basket is disclosed. The rear tray comprises an upper surface and a lower surface opposite the upper surface, and it is configurable in both a retracted state and a deployed state when coupled to the front basket. In the deployed state, the rear tray forms a perpendicular relationship with the front basket, while in the retracted state, the upper surface of the rear tray contacts a side of the front basket.

In some embodiments, the rear tray may further comprise a first monolithic insert.

In some embodiments, the rear tray may further comprise a front lip rotatably coupled a front edge of the rear tray. In some embodiments, the front lip may further comprise a second monolithic insert.

In some embodiments, the front lip may comprise an orthogonal relationship with the rear tray when in the deployed state.

In some embodiments, the front lip may contact the upper surface of the rear tray to form a parallel relationship therewith when in the retracted state.

In some embodiments, the front lip may contact the outer surface of the rear side when in the retracted state.

In some embodiments, the rear tray may further comprise a first side support and a second side support. The first and second side supports may be coupled to the rear tray at opposite sides and form a parallel relationship while in the deployed state, with both the first side support and the second side support further coupled to the front lip.

In some embodiments, the first side support and the second side support may each further comprise a trapezoidal shape.

In some embodiments, the first side support and the second side support may each further comprise a first fold and a second fold while entering the retracted state, wherein the first fold is configured to rotate the front lip to contact the upper surface of the rear tray, and the second fold is configured to rotate the rear tray towards the front basket such that the upper surface of the rear tray and the front lip both are configured to contact a side of the front basket.

In some embodiments, the first side support and the second side support may be mutually perpendicular with the front lip and the rear tray while in the deployed state.

In some embodiments, the rear tray may further comprise a fastener element coupled to at least one of the rear tray or the front lip, wherein the fastener element is configured to engage with the front basket to maintain the rear tray in the retracted state.

Each of the components of the detachable walker basket and related system described herein may be manufactured and/or assembled in accordance with the conventional knowledge and level of a person having skill in the art.

While various details, features, combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

First Illustrated Embodiment

Now turning to the drawings, FIG. 1-8 show a detachable walker basket (100) configured to removably couple to a walking aid device (not shown) such as walkers, rollators, and similar devices designed to assist a person in walking. The detachable walker basket comprises a front basket (110), a rear tray (120), a front lip (130), a first side support (140), a second side support (141), a fastener element (150), and a plurality of external fasteners (160). The front basket comprises a basket compartment (118) formed by a front side (111), a rear side (112) opposite the front side, a first lateral side (115), a second lateral side (116) opposite the first lateral side, and a bottom section (117). The rear side (112) further comprises an outer surface (114) and an inner surface (113) opposite the outer surface, wherein the inner surface forms a portion of the basket compartment. Each of the sides extends from the bottom section to an upper basket edge (119). The rear tray comprises an upper surface (127) and a lower surface (128) opposite the upper surface. The rear tray further comprises a front edge (121), a rear edge (122) opposite the front edge, a first side edge (123), and a second side edge (124) opposite the first side edge. The rear edge is hingedly coupled to the rear side of the front basket at the outer surface. The rear tray further comprises a first monolithic insert (129), which either constitutes the rear tray itself or is integrated into the rear tray for structural support and stability. The rear tray is hingedly coupled to the outer surface of the rear side of the front basket. The rear tray is configurable in both a retracted state (125) and a deployed state (126). In the deployed state, the rear tray forms a perpendicular relationship with the rear side of the front basket and aligns orthogonally to it. Positioned between the front basket and a user (not shown) of the associated walking aid device, the rear tray is configured to extend outward from the front basket and provide the upper surface for supporting items. In the retracted state, the rear tray folds compactly to form a parallel relationship with the rear side, with its upper surface contacting the rear side.

Rotatably coupled to the front edge (121) of the rear tray (120) is the front lip (130). In the deployed state (126), the front lip comprises an orthogonal relationship with the rear tray, while in the retracted state (125), the front lip contacts the upper surface (127) of the rear tray to form a parallel relationship therewith. The front lip further comprises a lip upper edge (131) such that when in the deployed state the front lip comprises a lip height (132) extending from the front edge (121) to the lip upper edge. The lip height is less than a height of the tray backside (133). The front lip further comprises a second monolithic insert (134), which is separate and distinct from the first monolithic insert. Similar to the first monolithic insert, the second monolithic insert either constitutes the front lip itself or is integrated within the front lip to ensure adequate structural support. Both inserts may be manufactured from materials like HDPE, PC, fiberglass, carbon fiber, or metal alloys. Other materials can be used as can be appreciated by one having skill in the art.

The first side support (140) and the second side support (141) are both shown having a trapezoidal shape (142). The side supports are both coupled to the rear side (112), the rear tray (120) and the front lip (130). The first side support is coupled at the first side edge (123) and the second side support is coupled at the second side edge (124) of the rear tray. In the deployed state (126), the first and second side supports are parallel to each other and are mutually perpendicular to both the rear tray and the front lip. When entering the retracted state (125), both side supports are configured to comprise a first fold (143) that causes the front lip to engage with the upper surface (127) of the rear tray, and a second fold (144) that causes the front lip and the upper surface of the rear tray to engage with the rear side. A fastener element (150), such as a hook-and-loop fastener, is configured to couple to a portion of the front basket (110) to maintain the rear tray in the retracted state. The fastener element can be coupled to at least one of the rear tray or the front lip and is configured to connect to a fastener receiver (151) coupled to the rear side of the front basket at the inner surface (113). The connection ensures that the rear tray remains compact and stable in a retracted state when not in use.

The plurality of external fasteners (160) is coupled to the rear side (112) disposed below the lower surface (128) of the rear tray (120), and are configured to detachably couple the walker basket to a walking aid device (not shown). The plurality of external fasteners comprises a plurality of right horizontal fasteners (161), a plurality of left horizontal fasteners (162), and a plurality of center vertical fasteners (163). The plurality of right horizontal fasteners extends past the second lateral side (116) of the front basket (110) and are configured to detachably couple to a vertically extending leg of a second side frame of the walking aid device (not shown). The plurality of left horizontal fasteners extend past the first lateral side (115) of the front basket and are configured to detachably couple to a vertically extending leg of a first side frame of the walking aid device. The plurality of center vertical fasteners extends past the bottom section (117) of the front basket and are configured to detachably couple to a horizontal crossbar of the walking aid device. The detachable walker basket may further comprise various accessory features to enhance functionality and convenience. The walker basket compartment may comprise optional adjustable dividers (170) allowing for customizable storage organization. The walker basket may further comprise a lateral side pouch (171) disposed on the second lateral side of the basket, and a frontside pouch (172) disposed on the front side (111) of the front basket, providing additional storage options. The walker basket may also comprise an accessory strap (173), disposed on the first lateral side of the basket and configured to receive cylindrical objects such as an umbrella, reaching tool, or cane. This strap may be constructed from an elastic material and comprise a hook-and-loop fastener for secure attachment. The detachable walker basket may be manufactured from materials such as polyester fabric or similar materials.

Second Illustrated Embodiment

Figure 9:
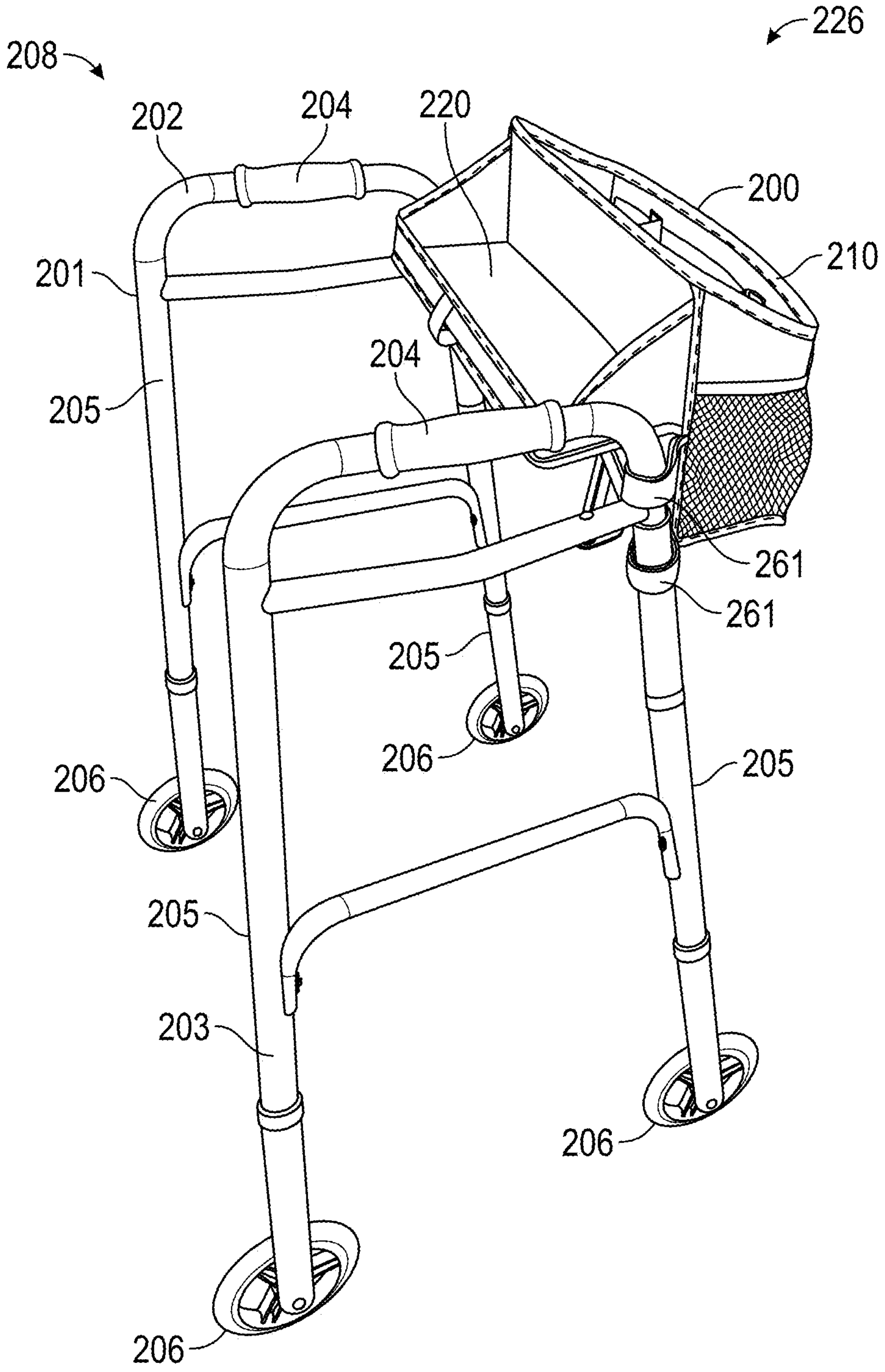
FIG. 9 shows a rear perspective view of a walking aid system in accordance with a second illustrated embodiment.
Figure 10:
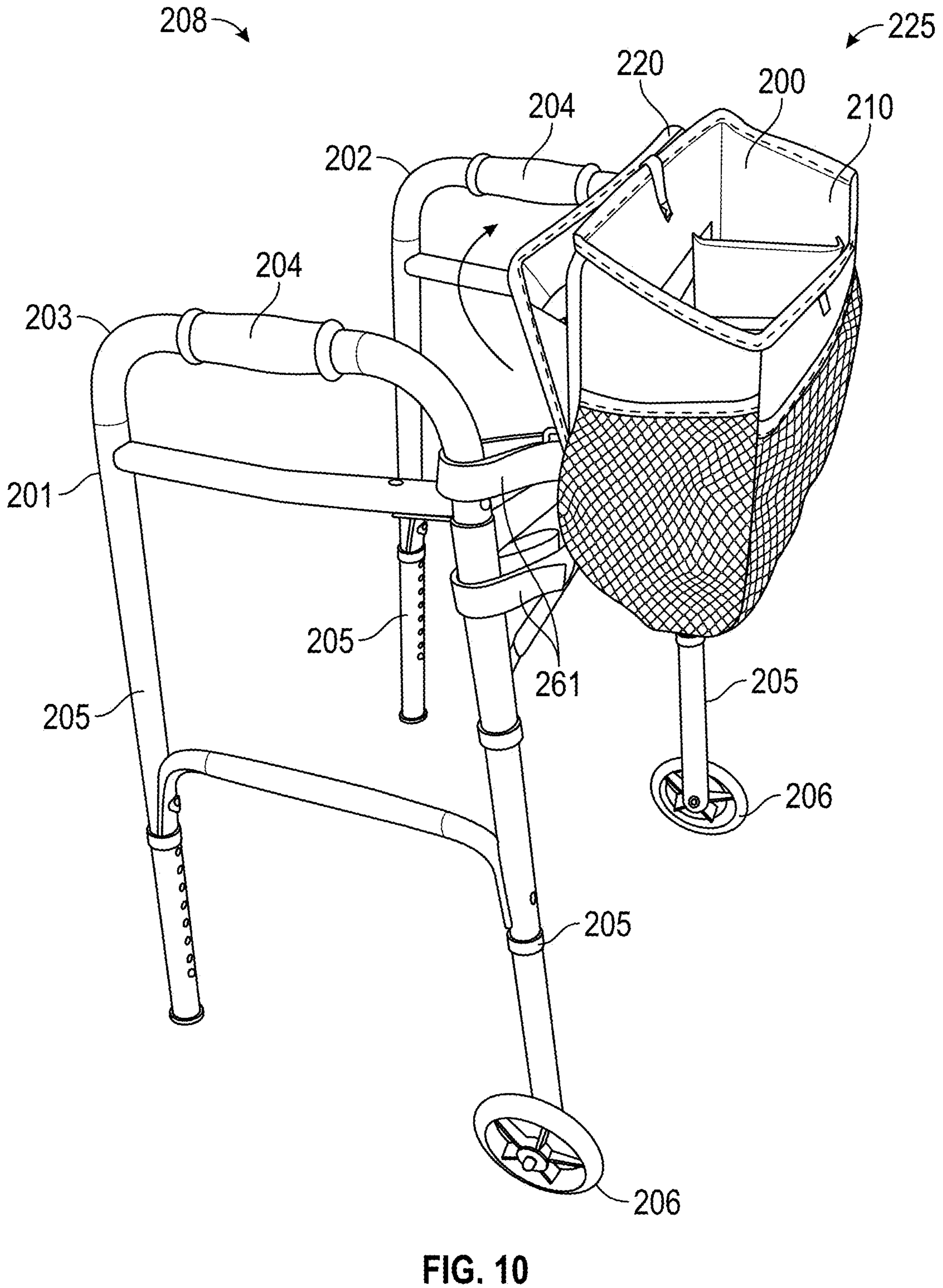
FIG. 10 shows a front perspective view of the walking aid system according to the second illustrated embodiment.
Figure 11:
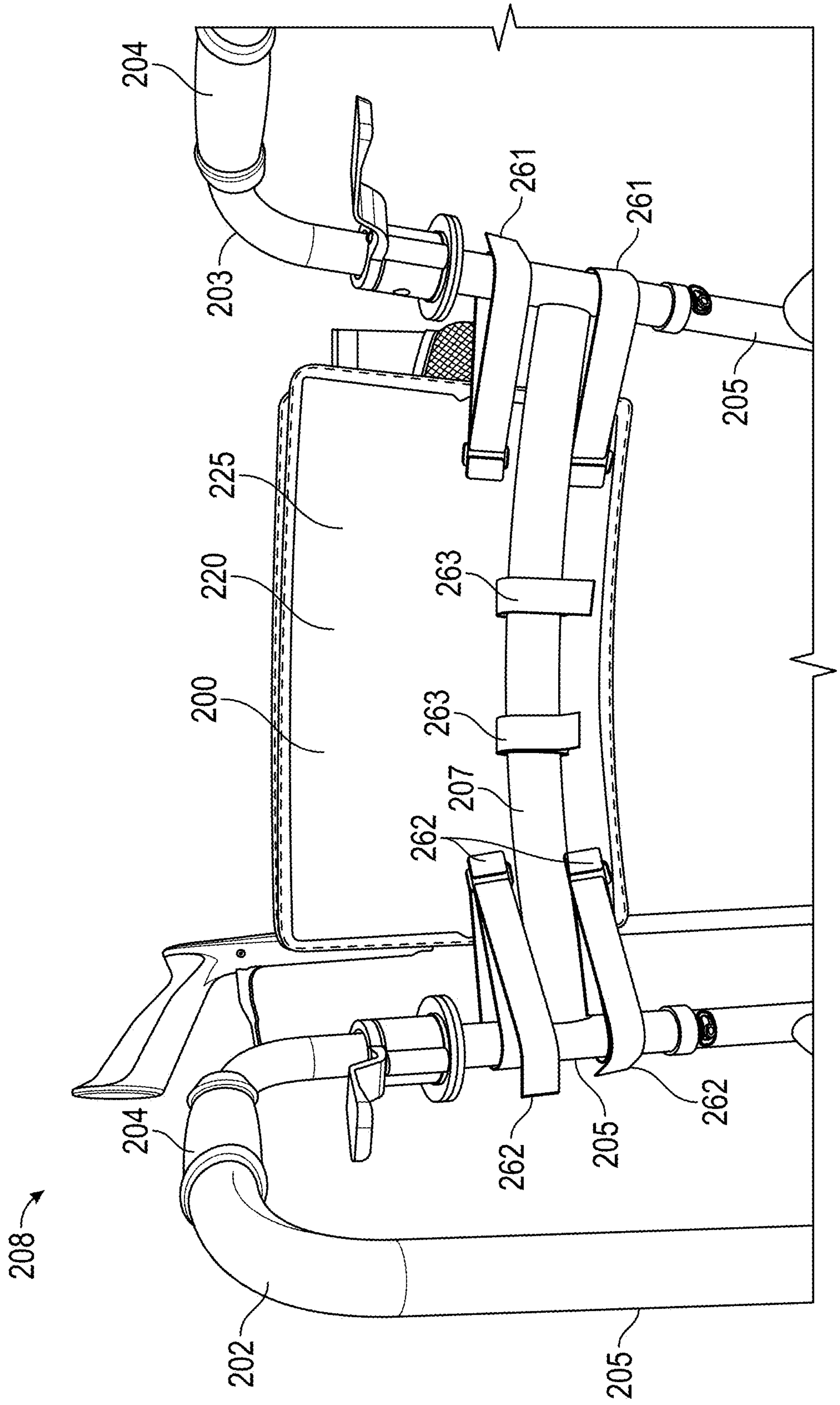
FIG. 11 shows a close-up rear view of the walking aid system according to the second illustrated embodiment.

FIG. 9-11 show a walking aid system comprising a detachable walker basket (200) coupled to a walking aid device (208). As shown, the walking aid device is specifically a walker (201) comprising a first side frame (202), a second side frame (203), and a horizontal crossbar (207), with the horizontal crossbar coupled to both the first side frame and the second side frame. The first and second side frames each comprise a pair of vertically extending legs (205) coupled to a handrail (204), with at least one of the vertically extending legs further coupled to a wheel (206). The detachable walker basket comprises a rear tray (220) hingedly coupled to a front basket (210) wherein the rear tray is configurable in a retracted state (225) and a deployed state (226). The detachable walker basket further comprises a plurality of external fasteners, namely right horizontal fasteners (261), left horizontal fasteners (262), and center vertical fasteners (263). The detachable walker basket as shown comprises a similar structure to the detachable walker basket in the first illustrated embodiment.

The right horizontal fasteners (261) are detachably coupled to the vertically extending leg (205) of the second side frame (203). The left horizontal fasteners (262) are detachably coupled to the vertically extending leg of the first side frame (202). The center vertical fasteners (263) are detachably coupled to the horizontal crossbar (207). In some embodiments the right horizontal fasteners and the left horizontal fasteners are configured to flank the horizontal crossbar for a secure attachment to the walking aid device. In the deployed state (226), the rear tray (230) is positioned to face the user of the walker, such that it is disposed between the user and the front basket (210), providing convenient accessibility and functionality.

Third Illustrated Embodiment

Figure 12:
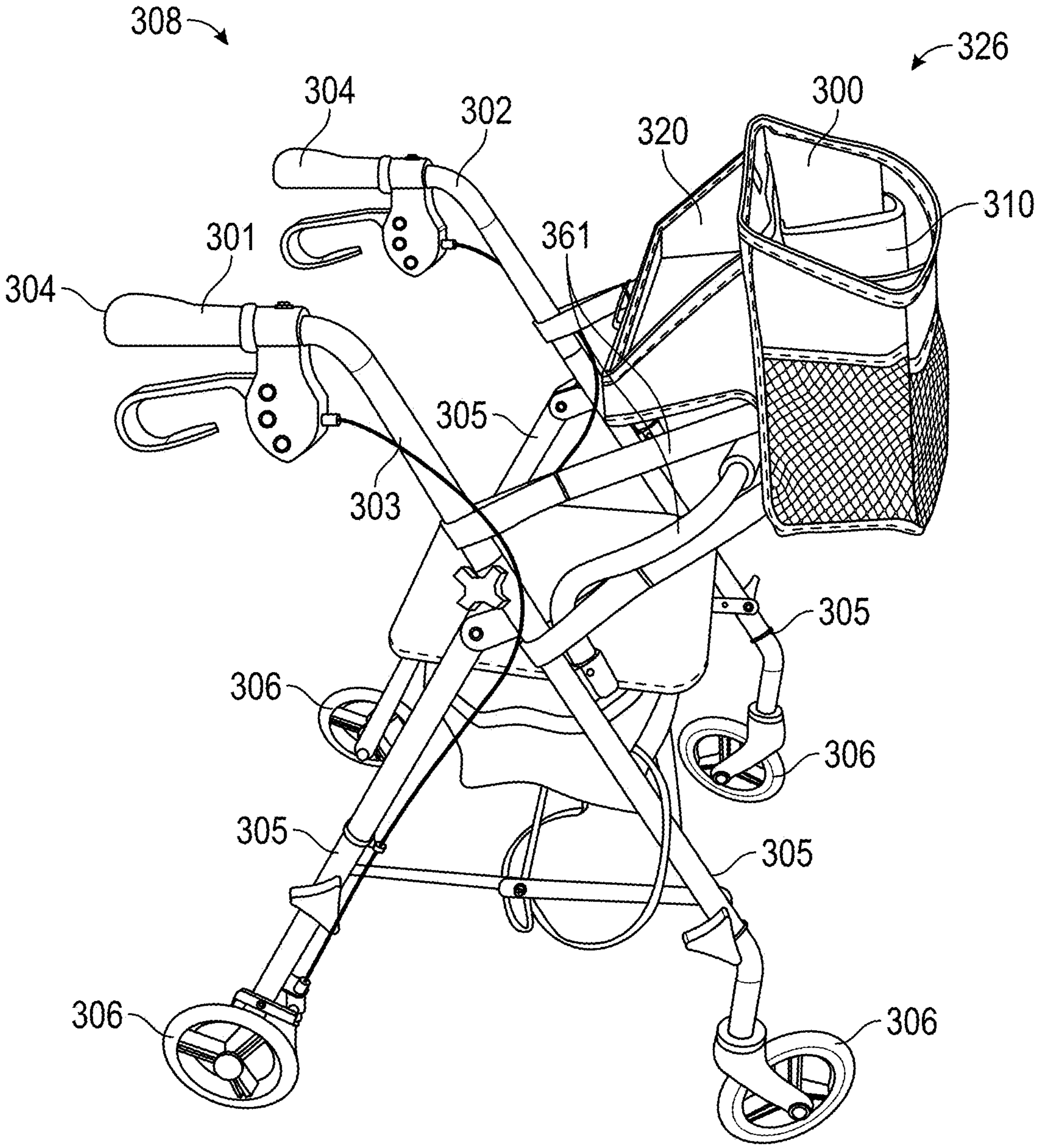
FIG. 12 shows a side view of a walking aid system in accordance with a third illustrated embodiment.
Figure 13:
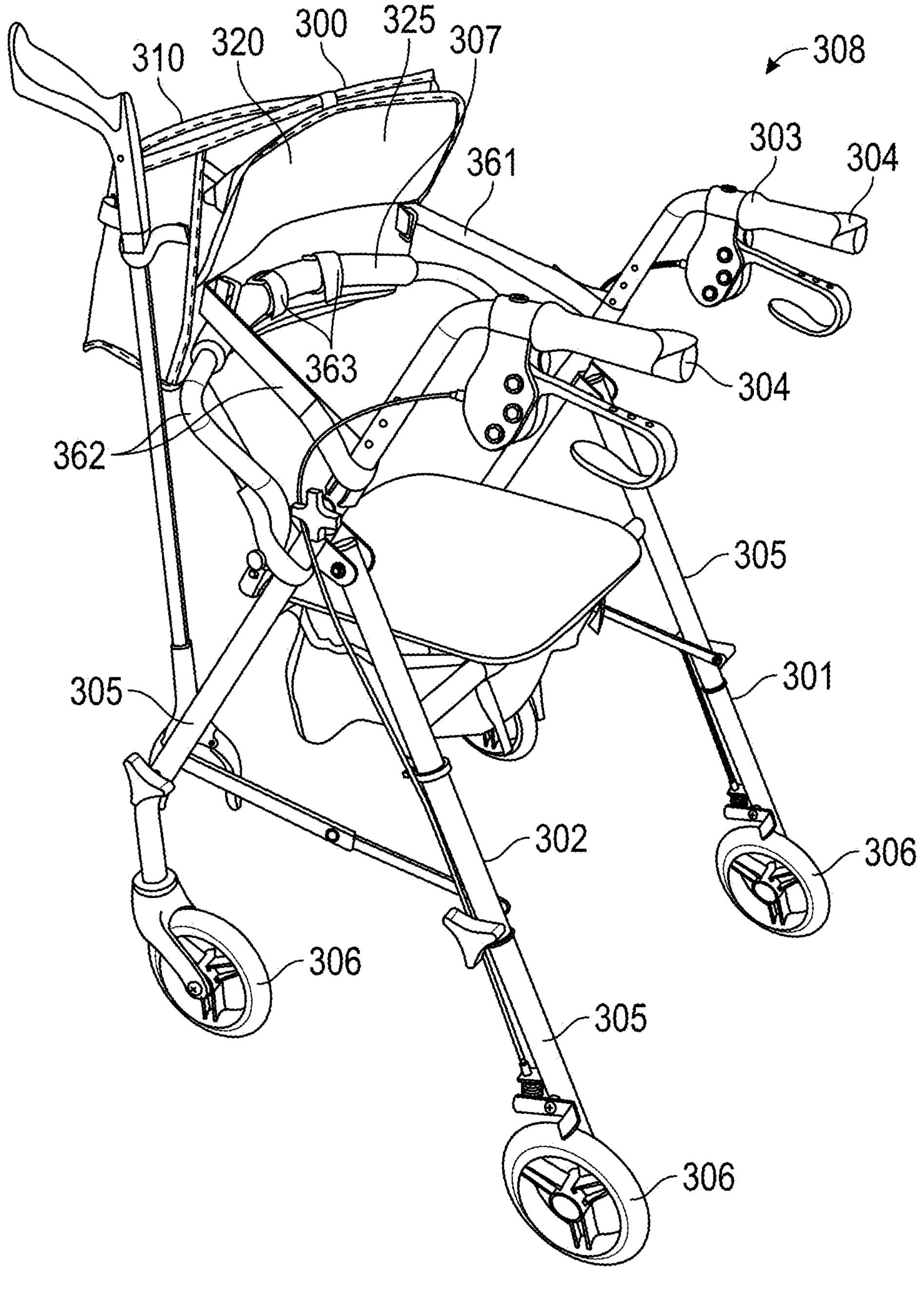
FIG. 13 shows a rear perspective view of the walking aid system according to the third illustrated embodiment.
Figure 14:
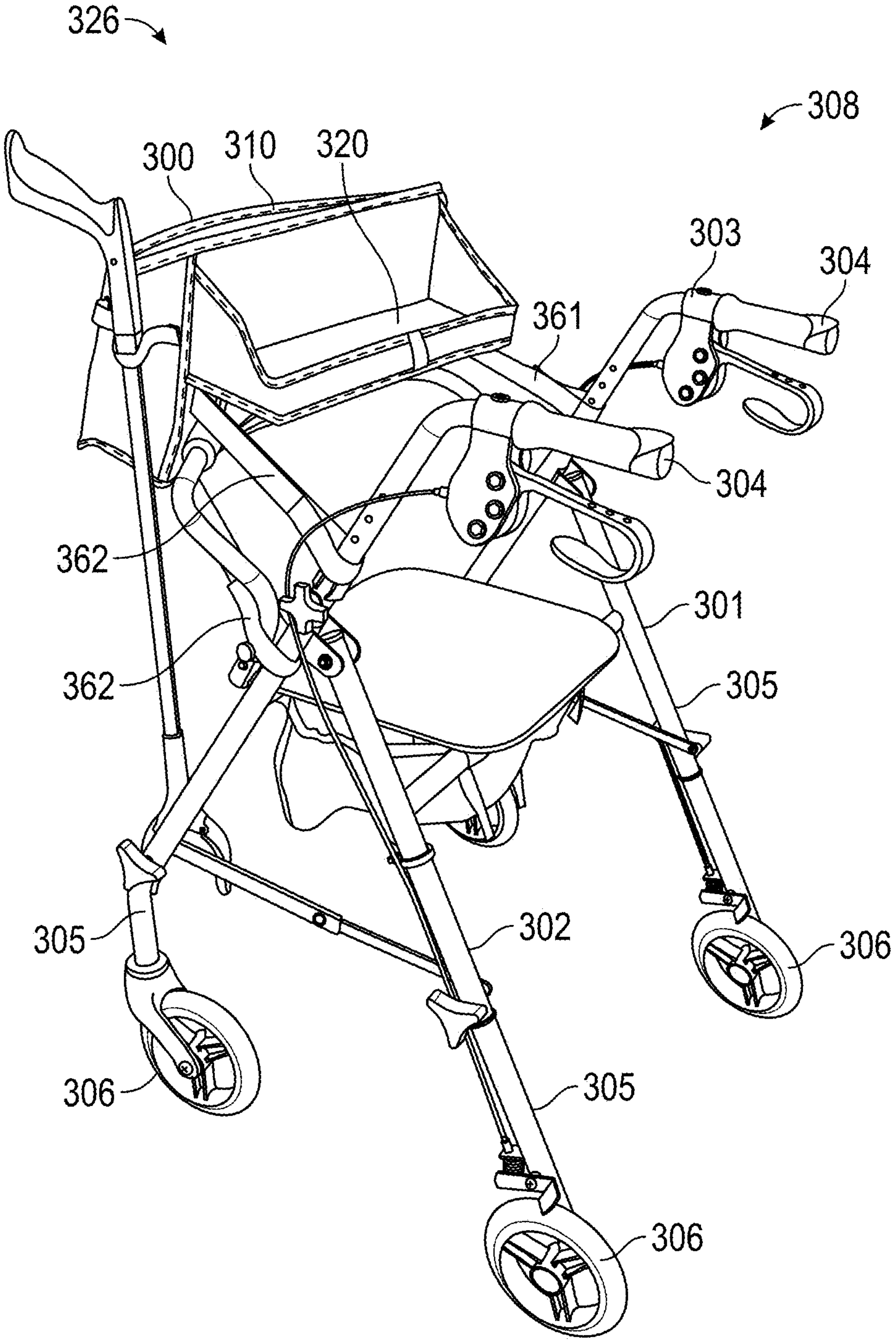
FIG. 14 shows an alternate rear perspective view of the walking aid system according to the third illustrated embodiment.

FIG. 12-14 show a walking aid system comprising a detachable walker basket (300) coupled to a walking aid device (308). As shown, the walking aid device is a rollator (301) comprising a first side frame (302), a second side frame (303), and a horizontal crossbar (307), with the horizontal crossbar coupled to both the first side frame and the second side frame. The first and second side frames each comprise a pair of vertically extending legs (305) coupled to a handrail (304), with each of the vertically extending legs further coupled to a wheel (306). The detachable walker basket comprises a rear tray (320) hingedly coupled to a front basket (310) wherein the rear tray is configurable in a retracted state (325) and a deployed state (326). The detachable walker basket further comprises a plurality of external fasteners, namely right horizontal fasteners (361), left horizontal fasteners (362), and center vertical fasteners (363). The detachable walker basket as shown comprises a similar structure to the detachable walker basket in the first illustrated embodiment.

The right horizontal fasteners (361) are detachably coupled to the vertically extending leg (305) of the second side frame (303). The left horizontal fasteners (362) are detachably coupled to the vertically extending leg of the first side frame (302). The center vertical fasteners (363) are detachably coupled to the horizontal crossbar (307). In some embodiments the right horizontal fasteners and the left horizontal fasteners are configured to flank the horizontal crossbar for a secure attachment to the walking aid device. In the deployed state (326), the rear tray (330) is positioned to face the user of the walker, such that it is disposed between the user and the front basket (310), providing convenient accessibility and functionality.

FEATURE LIST detachable walker basket (100; 200; 300)
front basket (110; 210; 310)
front side (111)
rear side (112)
inner surface (of rear side) (113)
outer surface (of rear side) (114)
first lateral side (115)
second lateral side (116)
bottom section (117)
basket compartment (118)
upper basket edge (119)
rear tray (120; 220; 320)
front edge (121)
rear edge (122)
first side edge (123)
second side edge (124)
retracted state (125; 225; 325)
deployed state (126; 226; 326)
upper surface (127)

lower surface (128)
first monolithic insert (129)
front lip (130)
lip upper edge (131)
lip height (132)
tray backside (133)
second monolithic insert (134)
first side support (140)
second side support (141)
trapezoidal shape (for the side supports) (142)
first fold (143)
second fold (144)
fastener element (150)
fastener receiver (151)
plurality of external fasteners (160)
right horizontal fasteners (161; 261; 361)
left horizontal fasteners (162; 262; 362)
center vertical fasteners (163; 263; 363)
adjustable basket dividers (170)
lateral side pouch (171)
frontside pouch (172)
accessory strap (173)
walker (201)
rollator (301)
first side frame (202; 302)
second side frame (203; 303)
handrail (204; 304)
vertically extending leg (205; 305)
wheel (206; 306)
horizontal crossbar (207; 307)
walking aid device (208; 308)

What is claimed is:

1. A detachable walker basket, comprising:

a front basket comprising a basket compartment formed by a front side, a rear side opposite the front side, a first lateral side, a second lateral side opposite the first lateral side, and a bottom section, the rear side further comprising an outer surface and an inner surface opposite the outer surface wherein the inner surface forms a portion of the basket compartment;

a rear tray comprising an upper surface and a lower surface opposite the upper surface, front edge, a rear edge opposite the front edge, a first side edge, and a second side edge opposite the first side edge, the rear edge hingedly coupled to the rear side at the outer surface, the rear tray configurable in a retracted state and a deployed state, the deployed state defined as the rear tray forming a perpendicular relationship with the rear side, and the retracted state defined as the upper surface of the rear tray contacting the rear side, the rear tray further comprising a first monolithic insert;

a front lip rotatably coupled to the rear tray at the front edge, wherein in the deployed state the front lip comprises an orthogonal relationship with the rear tray, and in the retracted state the front lip contacts the upper surface of the rear tray to form a parallel relationship therewith, the front lip further comprising a second monolithic insert wherein the second monolithic is separate and distinct from the first monolithic insert;

a first side support and a second side support each coupled to the rear tray and the front lip, the first side support coupled at the first side edge and the second side support coupled at the second side edge, the first side support and second side support form a parallel relationship while in the deployed state and are both mutually perpendicular to the front lip and the rear tray, the first side support and the second side support each further comprising a first fold and a second fold while entering the retracted state, wherein the first fold is configured to rotate the front lip to contact the upper surface of the rear tray, and the second fold is configured to rotate the rear tray towards the rear side such that the upper surface of the rear tray and the front lip both contact the outer surface of the rear side;

a fastener element coupled to at least one of the rear tray or the front lip, wherein the fastener element is configured to engage with the front basket to maintain the rear tray in the retracted state; and a plurality of external fasteners coupled to the rear side below the rear tray, the plurality of fasteners configured to detachably couple to a walking aid device, the plurality of external fasteners further comprising a right horizontal fastener, a left horizontal fastener, and a center vertical fastener, wherein the right horizontal fastener extends past the second lateral side of the front basket, the left horizontal fastener extends past the first lateral side of the front basket, and the center vertical fastener extends past the bottom section of the front basket.

2. The detachable walker basket of claim 1, wherein in the retracted state, the front lip contacts the outer surface of the rear side.

3. The detachable walker basket of claim 1, the first side support and the second side support each further comprising a trapezoidal shape.

4. A detachable walker basket, comprising:

a front basket comprising a basket compartment formed by a front side, a rear side opposite the front side, a first lateral side, a second lateral side opposite the first lateral side, and a bottom section;

a rear tray hingedly coupled to the rear side of the front basket, the rear tray comprising an upper surface and a lower surface opposite the upper surface, the rear tray configurable in a retracted state and a deployed state, the deployed state defined as the rear tray forming a perpendicular relationship with the rear side, and the retracted state defined as the upper surface of the rear tray contacting the rear side; and a plurality of external fasteners coupled to the rear side, the plurality of fasteners configured to detachably couple to a walking aid device.

5. The detachable walker basket of claim 4, wherein the rear tray is configured to be disposed between the front basket and a user of the walking aid device when the detachable walker basket is installed.

6. The detachable walker basket of claim 4, wherein each of the plurality of external fasteners is disposed below the rear tray.

7. The detachable walker basket of claim 4, the rear tray further comprising a first monolithic insert.

8. The detachable walker basket of claim 4, further comprising a front lip rotatably coupled to the rear tray.

9. The detachable walker basket of claim 8, the front lip further comprising a second monolithic insert.

10. The detachable walker basket of claim 8, wherein in the deployed state the front lip comprises an orthogonal relationship with the rear tray.

11. The detachable walker basket of claim 8, wherein in the retracted state the front lip contacts the upper surface of the rear tray to form a parallel relationship therewith.

12. The detachable walker basket of claim 8, further comprising a first side support and a second side support, the first side support and the second side support are coupled to the rear tray at opposite sides and form a parallel relationship while in the deployed state, both the first side support and the second side support further coupled to the front lip.

13. The detachable walker basket of claim 12, the first side support and the second side support each further comprising a trapezoidal shape.

14. The detachable walker basket of claim 12, the first side support and the second side support each further comprising a first fold and a second fold while entering the retracted state, wherein the first fold is configured to rotate the front lip to contact the upper surface of the rear tray, and the second fold is configured to rotate the rear tray towards the rear side such that the upper surface of the rear tray and the front lip both contact the outer surface of the rear side.

15. The detachable walker basket of claim 12, wherein the first side support and the second side support are both mutually perpendicular with the front lip and the rear tray while in the deployed state.

16. The detachable walker basket of claim 4, further comprising a fastener element coupled to at least one of the rear tray or the front lip, wherein the fastener element is configured to engage with the front basket to maintain the rear tray in the retracted state.

17. The detachable walker basket of claim 4, the plurality of external fasteners further comprising a right horizontal fastener, a left horizontal fastener, and a center vertical fastener.

18. The detachable walker basket of claim 17, wherein the right horizontal fastener extends past the second lateral side of the front basket, the left horizontal fastener extends past the first lateral side of the front basket, and the center vertical fastener extends past the bottom section of the front basket.

19. The detachable walker basket of claim 4, further comprising one or more accessory straps coupled to at least one of the first lateral side or the second lateral side, each of the one or more accessory straps configured to receive a cylindrical object.

20. A walking aid system, comprising a detachable walker basket, the detachable walker basket comprising:

a front basket comprising a basket compartment formed by a front side, a rear side opposite the front side, a first lateral side, a second lateral side opposite the first lateral side, and a bottom section, a rear tray hingedly coupled to the rear side of the front basket, the rear tray comprising an upper surface and a lower surface opposite the upper surface, the rear tray configurable in a retracted state and a deployed state, the deployed state defined as the rear tray forming a perpendicular relationship with the rear side, and the retracted state defined as the upper surface of the rear tray contacting the rear side, and a plurality of external fasteners coupled to the rear side, the plurality of fasteners configured to detachably couple to a walking aid device; and a walking aid device, the walking aid device comprising:

a horizontal crossbar, and a first side frame and a second side frame each coupled to opposite ends of the horizontal crossbar, each of the first side frame and the second side frame comprising a handrail and plurality of vertically extending legs;

wherein the plurality of external fasteners is coupled to the horizontal crossbar, one of the plurality vertically extending legs of the first side frame, and one of the plurality of vertically extending legs of the second side frame.

* * * * *